United States Patent Office 3,634,314
Patented Jan. 11, 1972

3,634,314
FLAME RETARDANT SOLID POLYMERIC
COMPOSITIONS
Henryk A. Cyba, Evanston, Ill., assignor to Universal
Oil Products Company, Des Plaines, Ill.
No Drawing. Continuation-in-part of application Ser. No.
770,123, Oct. 23, 1968, now Patent No. 3,542,805,
which is a continuation-in-part of application Ser. No.
720,339, Apr. 10, 1968, which in turn is a continuation-
in-part of abandoned application Ser. No. 329,979, Dec.
12, 1963. This application Aug. 27, 1969, Ser. No.
853,520
Int. Cl. C08f 45/60; C08g 51/60; C09k 3/28
U.S. Cl. 260—45.8 N                        7 Claims

ABSTRACT OF THE DISCLOSURE

Flame retardant solid polymeric composition containing hydroxyalkyl substituted polyhalopolyhydropolycyclic-dicarboxylic imides.

CROSS REFERENCE TO RELATED
APPLICATIONS

This is a continuation-in-part of application Ser. No. 770,123 filed Oct. 23, 1968, now U.S. Pat. 3,542,805 issued Nov. 24, 1970, which is continuation-in-part of application Ser. No. 720,339 filed Apr. 10, 1968, which is a continuation-in-part of application Ser. No. 329,979 filed Dec. 12, 1963 now abandoned.

BACKGROUND OF THE INVENTION

Parent application 720,339 relates to the reaction product of alkanolamines with polyhalopolyhydropolycyclic-dicarboxylic acids. In some cases the reaction products are amides and in other cases the reaction products are esters. For example, when the alkanolamine is an N-alkyl-alkanolamine, the reaction product presumably is an amide or, when the alkanolamine is an N,N-dialkyl-alkanolamine or an N-alkyl-dialkanolamine, the reaction product is an ester. Also included are polymers which may comprise polyamides, polyesters and mixed mono-ester-monoamide.

DESCRIPTION OF THE INVENTION

When the alkanolamine contains a primary amine group, the reaction product is an imide and the present application is directed to the use of such novel compositions of matter to impart flame retardant properties to solid polymeric compositions.

The novel compositions of matter for use in the present invention are illustrated by the following general structure:

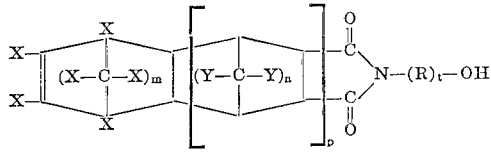

where $x$ is halogen, particularly chlorine and/or bromine, hydrogen or alkyl of from one to 10, preferably one to four, carbon atoms, at least two of the X's being halogen, Y is halogen, hydrogen or alkyl of from one to 10, preferably one to four, carbon atoms, $m$ is an integer of from one to four, $n$ ranges from zero to four and $p$ ranges from zero to four, R and OH taken together are an alkanolamine residue and $t$ is zero or one.

The compounds for use in the present invention are prepared in any suitable manner. In a preferred method, they are prepared by utilizing a polyhalopolyhydropoly-cyclicdicarboxylic acid and more particularly, the an- hydride thereof. Any suitable acid or anhydride meeting these requirements is used in accordance with the present invention. In one embodiment, the acid or anhydride is of the type known in the art as "Chlorendic" or "HET" acid or anhydride. This acid is prepared by the Diels-Alder addition reaction of maleic acid and hexachlorocyclopentadiene or more conveniently by the reaction of maleic anhydride and hexachlorocyclopentadiene to form the corresponding anhydride and then hydrolyzed to form the acid. The corresponding anhydride is prepared by the reaction of maleic anhydride and hexachlorocyclopentadiene. This acid or anhydride also may be named 1,4,5,6,7,7 - hexachlorodicyclo-(2.2.1)-5-heptene-2,3-dicarboxylic acid or the corresponding anhydride. These compounds are prepared by the reaction of equal molar quantities of the reactants, generally by refluxing preferably at about 350° F. in the presence of a solvent. These reactions are well known in the art and are described, for example, in U.S. Pat. 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2-dichlorocyclopentadiene,
1,5-dichlorocyclopentadiene,
1,2,3-trichlorocyclopentadiene,
1,2,3,4-tetrachlorocyclopentadiene,
1,2,3,4,5-pentachlorocyclopentadiene and similar compounds in which all or part of the chlorine is replaced by other halogen and particularly bromine.

A particularly preferred polyhalopolyhydropolycyclic-dicarboxylic acid or anhydride is prepared by the Diels-Alder condensation of a conjugated aliphatic diene with an olefinic dicarboxylic acid and then further condensing the resultant cyclohexenedicarboxylic acid with a halocycloalkadiene. A specifically preferred reaction product is the Diels-Alder condensation of 1,3-butadiene with maleic anhydride to form 1,2,3,6-tetrahydrophthalic anhydride, followed by the Diels-Alder condensation with hexachlorocyclopentadiene. The product may be named 5,6,7,8,9,9-hexachloro - 1,2,3,4,4a,5,8,8a-octahydro - 5,8-methano-2,3 - naphthalenedicarboxylic anhydride, hereinafter referred to as "A" anhydride. The corresponding acid is prepared preferably by starting with maleic anhydride as above and hydrolyzing the formed "A" anhydride to the "A" acid. The acid may be named 5,6,7,8,9,9-hexachloro-1,2,3,4,4a,5,8,8a - octahydro - 5,8 - methano-2,3-naphthalenecarboxylic acid, hereinafter referred to as "A" acid. Here again, other conjugated aliphatic dienes may be used including, for example, 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene, conjugated nonadienes, etc., halodienes as, for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, those specifically hereinbefore set forth. The preparation of these compounds also is known in the art and is set forth in detail is U.S. Pat. 3,017,431.

Still another preferred polyhalopolyhydropolycyclicdi-carboxylic acid or anhydride is prepared by condensing cyclopentadiene with maleic acid or maleic anhydride to form norborn-5-ene-2,3 - dicarboxylic acid or anhydride and then condensing the same with hexachlorocyclopentadiene. The product may be named 5,6,7,8,9,9-hexachloro-1,2,3,4,4a,5,8,8a-octahydro - 1,4,5,8 - dimethano - 2,3-naphthalenedicarboxylic acid or anhydride, hereinafter referred to as "B" acid and "B" anhydride respectively. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

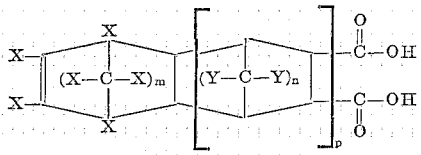

in which the symbols are the same as hereinbefore defined.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7-hexachlorobicyclo-(2.2.1)-5-heptene-2,3-dicarboxylic acid or the corresponding anhydride. Similarly, when X is chlorine, $m$ is one, $n$ is zero and $p$ is one, the compound is 5,6,7,8,9,9 - hexachloro - 1,2,3,4,4a,5,8,8a - octahydro-5,8-methano-2,3-naphthalenedicarboxylic acid or the corresponding anhydride. Also, when X is chlorine, Y is hydrogen, $m$ is one, $n$ is one and $p$ is one, the compound is 5,6,7,8,9,9-hexachloro-1,2,3,4,4a,5,8,8a-octahydro-1,4,5,8-dimethano-2,3-naphthalenedicarboxylic acid or the corresponding anhydride.

While the particular anhydride or the acid set forth above is preferred for use as a reactant, it is understood that a lower alkyl ester may be used. The lower alkyl ester is prepared by reacting the acid or anhydride with an alcohol, such as methanol, ethanol, propanol or butanol under conditions to liberate water.

The dicarboxylic anhydride, acid or ester set forth above is reacted with an alkanolamine or hydroxylamine. The use of hydroxylamine as a reactant results in a compound of the above formula in which $t$ is zero. The ultimate reaction products may be generically named as N-hydroxy-polyhalopolyhydropolycyclicdicarboxylic imide.

In another embodiment, the dicarboxylic anhydride, acid or ester is reacted with an alkanolamine. In one embodiment, the alkanolamine comprises a monoalkanolamine, and, in this embodiment, R preferably ranges from two to 20 carbon atoms and $t$ is one. Illustrative monoalkanolamines include ethanolamine, propanolamine, butanolamine, pentanolamine, hexanolamine, heptanolamine, octanolamine, nonanolamine, decanolamine, undecanolamine, dodecanolamine, tridecanolamine, tetradecanolamine, pentadecanolamine, hexadecanolamine, heptadecanolamine, octadecanolamine, nonadecanolamine, eicosanolamine, etc. The alkyl chain of the monoalkanolamine may be straight or branched. It is understood that a mixture of alkanolamines may be used, preferably being selected from those hereinbefore set forth. The ultimate reaction products may be generically named as N-(hydroxyalkyl)-polyhalopolyhydropolycyclicdicarboxylic imides.

In another embodiment, the alkanolamine is an N-dialkanol-alkylenediamine. Referring to the structure hereinbefore set forth, R and OH taken together will comprise:

—R'—N—(R''—OH)—R'''—OH where R', R'' and R''' are alkylene groups of from one to 20 and preferably from two to six carbon atoms each.

Illustrative preferred N-dialkanol-alkylenediamines include

N-diethanol-ethylenediamine,
N-dipropanol-ethylenediamine,
N-dibutanol-ethylenediamine,
N-dipentanol-ethylenediamine,
N-dihexanol-ethylenediamine,
N-diethanol-propylenediamine,
N-dipropanol-propylenediamine,
N-dibutanol-propylenediamine,
N-dipentanol-propylenediamine,
N-dihexanol-propylenediamine,
N-diethanol-butylenediamine,
N-dipropanol-butylenediamine,
N-dibutanol-butylenediamine,
N-dipentanol-butylenediamine,
N-dihexanol-butylenediamine,
N-diethanol-pentylenediamine,
N-dipropanol-pentylenediamine,
N-dibutanol-pentylenediamine,
N-dipentanol-pentylenediamine,
N-dihexanol-pentylenediamine,
N-diethanol-hexylenediamine,
N-dipropanol-hexylenediamine,
N-dibutanol-hexylenediamine,
N-dipentanol-hexylenediamine,
N-dihexanol-hexylenediamine, etc.

It is understood that a mixture of dialkanol-alkylenepolyamines may be used, preferably being selected from those hereinbefore set forth. The ultimate reaction products may be generically named N-(N'-dialkanol-aminoalkyl)-polyhalopolyhydropolycyclicdicarboxylic imides.

In another and preferred embodiment, the alkanolamine is an aminoalkyl-alkanolamine which also is named N-(aminoalkyl)-alkanolamine. In this embodiment, R and OH taken together in the above structure comprise:

—R'—NH—R''—OH where R' and R'' comprise alkylene groups of from one to 20 and preferably from two to six carbon atoms each.

Illustrative aminoalkyl-alkanolamines include, aminoethyl-ethanolamine,
aminopropyl-ethanolamine,
aminobutyl-ethanolamine,
aminopentyl-ethanolamine,
aminohexyl-ethanolamine,
aminoethyl-propanolamine,
aminopropyl-propanolamine,
aminobutyl-propanolamine,
aminopentyl-propanolamine,
aminohexyl-propanolamine,
aminoethyl-butanolamine,
aminopropyl-butanolamine,
aminobutyl-butanolamine,
aminopentyl-butanolamine,
aminohexyl-butanolamine,
aminoethyl-pentanolamine,
aminopropyl-pentanolamine,
aminobutyl-pentanolamine,
aminopentyl-pentanolamine,
aminohexyl-pentanolamine,
aminoethyl-hexanolamine,
aminopropyl-hexanolamine,
aminobutyl-hexanolamine,
aminopentyl-hexanolamine,
aminohexyl-hexanolamine, etc.

Here again, it is understood that a mixture of the aminoalkyl-alkanolamines may be used, preferably being selected from those hereinbefore set forth. The ultimate reaction products may be generically named as N-(hydroxyalkyl-aminoalkyl) - polyhalopoly - hydropolycyclicdicarboxylic imide.

In still another embodiment, the alkanolamine is an aminoalkyl-hydroxyalkyl ether. In this embodiment, referring to the structure hereinbefore set forth, R and OH taken together comprise:

—R'—O—R''—OH where R' and R'' are alkylene groups of from one to 20 and preferably from two to six carbon atoms each. Illustrative alkanolamines include aminoethyl-hydroxyethyl ether,
aminopropyl-hydroxyethyl ether,
aminobutyl-hydroxyethyl ether,
aminopentyl-hydroxyethyl ether,
aminohexyl-hydroxyethyl ether,
aminoethyl-hydroxypropyl ether,
aminopropyl-hydroxypropyl ether,
aminobutyl-hydroxypropyl ether,
aminopentyl-hydroxypropyl ether,
aminohexyl-hydroxypropyl ether,
aminoethyl-hydroxbutyl ether,
aminopropyl-hydroxybutyl ether,
aminobutyl-hydroxybutyl ether,
aminopentyl-hydroxybutyl ether,
aminohexyl-hydroxybutyl ether,
aminoethyl-hydroxypentyl ether,
aminopropyl-hydroxypentyl ether,
aminobutyl-hydroxypentyl ether,
aminopentyl-hydroxypentyl ether,
aminohexyl-hydroxypentyl ether,
aminoethyl-hydroxyhexyl ether,
aminopropyl-hydroxyhexyl ether,
aminobutyl-hydroxyhexyl ether,
aminopentyl-hydroxyhexyl ether,
aminohexyl-hydroxyhexyl ether, etc.

The ultimate reaction product may be generically named as N-(hydroxyalkyl-oxa-alkyl)-polyhalopolyhydropolycyclicdicarboxylic imide.

In still another embodiment, R in the structure hereinfore set forth contains sulfur. These alkanolamines will be the thioether analogs of the ether derivatives hereinfore set forth and are aminoalkyl-hydroxyalkyl sulfides. Illustrative compounds include aminoethyl-hydroxyethyl sulfide,
aminopropyl-hydroxyethyl sulfide,
aminobutyl-hydroxyethyl sulfide,
aminopentyl-hydroxyethyl sulfide,
aminohexyl-hydroxyethyl sulfide,
aminoethyl-hydroxypropyl sulfide,
aminopropyl-hydroxypropyl sulfide,
aminobutyl-hydroxypropyl sulfide,
aminopentyl-hydroxypropyl sulfide,
aminohexyl-hydroxypropyl sulfide,
aminoethyl-hydroxybutyl sulfide,
aminopropyl-hydroxybutyl sulfide,
aminobutyl-hydroxybutyl sulfide,
aminopentyl-hydroxybutyl sulfide,
aminohexyl-hydroxybutyl sulfide,
aminoethyl-hydroxypentyl sulfide,
aminopropyl-hydroxypentyl sulfide,
aminobutyl-hydroxypentyl sulfide,
aminopentyl-hydroxypentyl sulfide,
aminohexylhydroxypentyl sulfide,
aminoethyl-hydroxyhexyl sulfide,
aminopropyl-hydroxyhexyl sulfide,
aminobutyl-hydroxyhexyl sulfide,
aminopentyl-hydroxyhexyl sulfide,
aminohexyl-hydroxyhexyl sulfide, etc.

The ultimate reaction product may be generically named as N-(hydroxyalkyl-thia-alkyl)-polyhalopolyhydropolycyclicdicarboxylic imide.

In still another embodiment related to the above, R and OH in the above structure taken together are the residue from an alkanolamine of the following formula:

$$H_2N-R'-(OR'')_n-OH$$

where R' and R'' are alkylene groups of from one to 20 and preferably of from two to six carbon atoms each and $n$ is two to six. Such alkanolamines may be obtained by the oxyalkylenation of a monoalkanolamine. Illustrative alkanolamines in this embodiment include 1-amino-3,6-dioxa-8-hydroxyoctane,
1-amino-4,7-dioxa-9-hydroxynonane,
1-amino-5,8-dioxa-10-hydroxydecane,
1-amino-6,9-dioxa-11-hydroxyundecane,
1-amino-7,10-dioxa-12-hydroxydodecane,
1-amino-3,7-dioxa-10-hydroxydecane,
1-amino-4,8-dioxa-11-hydroxyundecane,
1-amino-5,9-dioxa-12-hydroxydodecane, etc.

When the alkanolamine contains more than two ether groups, illustrative compounds include 1-amino-3,6,9-trioxa-11-hydroxyundecane,
1-amino-4,7,10-trioxa-12-hydroxydodecane,
1-amino-5,8,11-trioxa-13-hydroxytridecane, etc.
1-amino-3,6,9,12-tetraoxa-14-hydroxytetradecane,
1-amino-4,7,10,13-tetraoxa-15-hydroxypentadecane,
1-amino-5,8,11,14-tetraoxa-16-hydroxyhexadecane, etc.

These ultimate reaction products may be generically named as N-(polyoxa-omega-hydroxyalkyl)-polyhalopolyhydropolycyclicdicarboxylic imide. A specific reaction product when using the alkanolamine containing two ether groups as produced by the oxyalkylenation of propanolamine is N - (4,7-dioxa-9-hydroxynonyl) - polyhalopolyhydropolycyclicdicarboxylic imide.

As hereinbefore set forth, the alkanolamine contains a primary amine group. The alkanolamine is reacted with the polycarboxylic anhydride, acid or ester in any suitable manner. The reaction generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on the particular solvent. For example, with benzene as the solvent, the temperature will be of the order of 175° F., with toluene the temperature will be of the order of 250° F., and with xylene in order of 300–320° F. Other preferred solvents include cumene, naphtha, Decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is being formed. The time of reaction is sufficient to effect the desired condensation and, in general, will range from one-half to forty hours or more. When using a higher temperature within the range hereinbefore set forth, a shorter time of reaction within the above range will be used, and vice versa. Preferably equal mole proportions of the alkanolamine and the anhydride, acid or ester are employed. However, a slight excess of either reactant may be used and generally will not exceed about two mole proportions of one reactant per one mole proportion of the other reactant.

The reaction product generally is recovered as a viscous liquid or solid. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, etc., Decalin, alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to twenty carbon atoms. The phenol may be used in a concentration of from about 5% and preferably from about 25% to about 500% by weight and, more particularly, from about 30% to about 200% by weight of the reaction product.

The imide of the present invention is used as an additive to plastics, polymers, copolymers, terpolymers, resins, elastomers, rubbers, textiles and fibers, both naturally occurring and synthetic in nature, such as cotton, wool, Dacron, nylon, rayon, etc., coatings, paints, varnishes, leather, foams, cellulose acetate butyrate, ethyl cellulose, cellulose propionate, etc., polyolefins such as polyethylene and polyethylene copolymers, polypropylene and polypropylene copolymers, polystyrene, polystyrene copolymers, polyvinyl acetate or alcohol and copolymers, polyesters, polyurethane, polyphenyl ethers, polycarbonates, polyamides, polyoxymethylenes, polyalkylene oxides such as polyethylene oxide, polyacrylates and copolymers, polymethacrylates and copolymers with styrene, butadiene, acrylonitrile, etc., epoxy resins, acrylonitrile-butadiene-styrene formulations (commonly known as ABS), polybutylene and acrylic ester modified styrene-acrylonitrile (ASA), methyl-methacrylate-styrene-butadiene terpolymers, etc. whereby the desirable physical characteristics of flameproofing or fire retardancy will be imparted to the aforementioned materials. This property will possess special advantages when preparing plastic or resinous material which will be utilized in places which may be subjected to excessive heat or possible flame such as architectural panels for construction work, skydomes, wall plugs for electrical connections, sockets, housings, coil forms, gang plugs, terminal blocks, ash trays, appliance structural parts and housing, furniture, etc. In addition, the compound when used as a constituent of paint, lacquer, varnishes, or protective coatings, films, etc. will also impart a fire resistency to these compounds, and, therefore, render them commercially attractive as articles of commerce. Furthermore, the flame retardancy of foams such as the polyurethane foams will greatly enhance their use as insulating material or soundproofing material. Also, besides imparting the desirable physical characteristics of flame retardancy to the various articles of manufacture, the additives will render clear plastics or resins more stable to color changes and, therefore, will be an important component of these compounds whenever it is desirable that discoloration of the finished product is to be avoided or will tend to render such articles unusable.

As hereinbefore set forth, the imide of the present invention is used as an additive in polymeric olefins such as polypropylene whereby the final product will possess advantageous physical properties such as an increased stability against deterioration, weathering, and aging which has been induced by chemical, physical, biological agents, or radiation. In addition, the polyolefins will have a higher ignition point as well as a high degree of flame retardance. The imide is added to polypropylene in a range of from about 2% to about 30% by weight of the polymeric material to be treated. Thereafter it will be found that the oxygen index will have increased while the burning rate will be decreased. Examples of other polymeric products which may be treated with the imides include epoxy resins such as the condensation product of epichlorohydrin and bisphenol-A. The epoxy resins in an uncured state will usually be thermoplastic and may range from low viscosity liquids to high melting point brittle solids. The resin may be cured by mixing a curing agent, such as phthalic anhydride, with the resin, admixing the resultant mixture with an imide of the acid of the type hereinbefore set forth and thereafter curing the mixture by treatment at an elevated temperature for a predetermined period of time. The resultant product will have the physical characteristics thereof altered to their desirable values as pertains to color stability and flame retardancy and thus may be utilized for various purposes such as floor surfacings, coatings, etc. Other types of polymeric compounds which may be treated with the novel imides of the present invention will include polyphenyl ethers (polyphenylene oxides) which have been modified by treatment with styrene, polycarbonates, polyesters, polyurethane foams, etc.

It is also contemplated within the scope of this invention that other conventional flame retardants including, but not limited to, phosphate esters, alkyl diaryl phosphates, cresol diphenyl phosphate, octyl diphenyl phosphate, triaryl phosphates, tributyl phosphate, triphenyl phosphate, phosphonate esters, antimony oxide, barium metaborate, zinc borate, boric acid, dibutyl tin maleate, etc. may be used in conjunction with the imides of the present invention.

The imide of the present invention will be used in a concentration of from about 2% to about 50% and generally from about 2% to about 30% by weight of the polymeric material. In one embodiment the imide is solely an additive and, in another embodiment, the imide is in effect a monomer because it reacts with a reactive functional group in the preparation of the polymeric product.

The imide of the present invention is incorporated in the substrate in any suitable manner and preferably the mixture is suitably agitated or otherwise mixed in order to obtain intimate admixing of the imide and of the substrate. When the substrate comprises a mixture of two or more components, the imide of the present invention may be commingled with one of the components prior to mixing with the remaining component or components of the substrate.

The following examples are introduced to illustrate further the novelty and utility of the present invention but not with the intention of unduly limiting the same.

EXAMPLE I

The imide of this example is prepared by the reaction of aminoethyl-ethanolamine and "A" anhydride (5,6,7,8,9,9 - hexachloro-1,2,3,4,4a,5,8,8a-octahydro-5,8-methano-2,3-naphthalenedicarboxylic anhydride). Specifically, 425 g. (one mole) of "A" anhydride, 105 g. (one mole) of aminoethylethanolamine were charged to a reaction flask, together with about one liter of toluene and a trace of acid resin. The acid resin in this case is commercially available "Amberlite" which is sulfonated polystyrene. The acid normally is not required. The mixture was heated to reflux and the water of reaction was removed. Approximately 18 cc. of water was recovered in one and one-half hours. The heating and refluxing was continued for another four hours and the total amount of water recovered was 18.4 cc. Following completion of the reaction, the reaction mixture was cooled to about 95° F. and then was treated with 100 g. of potassium carbonate. The product was further worked up by dissolving in 500 cc. of benzene and heating to about 115° F., following by filtering off solids and subsequently evaporating on a steam bath under vacuum to produce 441 g. of a white solid. The product is illustrated by the following structure:

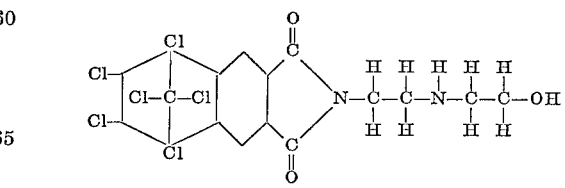

calculated basic nitrogen is 511, total nitrogen is 5.48% and total chlorine is 41.6% for the above compound. Actual analysis of the product prepared in the above manner showed basic nitrogen of 509, total nitrogen of 5.30% and total chlorine of 41.0%. It will be noted that the actual analysis corresponds very close to the theoretical for the above compound.

EXAMPLE II

The imide of this example was prepared by the reaction of 1 - amino-4,7-dioxa-9-hydroxynonane, a commercially available material, and "A" anhydride. The reaction was effected by commingling 326 g. (two moles) of the nonane with 42 g. (one mole) of "A" anhydride. The mixture was heated slowly at 100° to 140° F. and formed a homogeneous solution. Mixing was continued and the temperature was gradually raised to about 240° F. over a period of about two hours, at which time 100 g. of toluene was added and the mixture was refluxed for an additional four hours at a temperature range from 230 to 270° F. A total of 18 cc. of water was removed. Following completion of the reaction, the toluene was removed by vacuum distillation. Under these conditions, the product reacted in equal mole proportions to form the imide which is N-(4,7-dioxa-9-hydroxynonyl)-5,6,7,8,9,9-hexachloro-1,2,3,4,4a,5,8,8a - octahydro-5,8-methano-2,3-naphthalenedicarboxylic imide.

EXAMPLE III

The imide of this example is prepared by reacting an ethyl ester of "B" acid (5,6,7,8,9,9-hexachloro-1,2,3,4,4a,5,8,8a - octahydro - 1,4,5,8-dimethano-2,3-naphthalenedicarboxylic acid) with aminopropyl-propanolamine. The ester of "B" acid and ethyl alcohol is prepared by refluxing the acid and an excess of the alcohol in the presence of 0.3% of concentrated sulfuric acid as catalyst. The resulting ester and aminopropyl-propanolamine are refluxed in the presence of xylene solvent and titanium tetrabutoxide to liberate ethanol and to form the imide product.

EXAMPLE IV

The imide of this example is prepared by reacting "Chlorendic" anhydride with N-(di-hydroxyethyl)-ethylenediamine. Equal mole proportions of the reactants are refluxed in the presence of xylene solvent for six hours. Water formed during the reaction is continuously removed. Following completion of the reaction, the imide is recovered in admixture with the xylene solvent and used in this manner as an additive to lubricating oil.

EXAMPLE V

In this example 425 g. (one mole) of "A" anhydride is reacted with 105 g. (one mole) of diglycol amine, which is a commercial beta-hydroxyethyl beta-aminoethyl ether, in xylene as an azeotropic solvent. 16.0 g. of water was collected in a Dean-Stark tube about 70 minutes of reflux. A total of 16.4 cc. of water was collected after four hours and 40 minutes of reflux. On cooling, a precipitate forms which was filtered off and washed extensively with warm methanol. The crystalline product which is N-(3-oxa-5-hydroxypentyl) - 5,6,7,8,9,9-hexachloro-1,2,3,4,4a,5,8,8a-octahydro-5,8-methano-2,3-naphthalenedicarboxylic imide had a capillary melting point of 178–185° C. and is illustrated by the formula below:

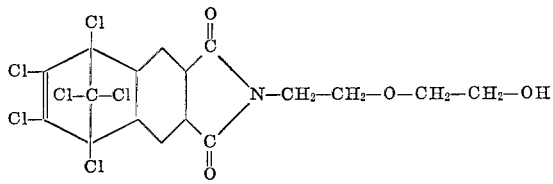

The phenylisocyanate value of this product was 2.4 meq./g. and the total nitrogen was 2.5%. Theoretical nitrogen is 2.7%.

EXAMPLE VI

In this example 425 g. (one mole) of anhydride "A" was placed in a two liter, three-neck flask together with 125 g. of ethanolamine (2.05 moles). During the addition with stirring, the temperature rose from 23° to 45° C. Upon heating to 75° C., the slurry became homogeneous. 67 cc. containing the water of the reaction and an excess of ethanolamine were removed and condensed in the Dean-Stark water trap after 23 hours of reflux. Upon filtration, crystallization occurred. The product was recrystallized from isopropyl alcohol, the product having a melting point of 195–200° C. The acetylation value of the product was 2.12 meq./g. (theoretical expected 2.14 meq./g.). This product is an N-(2-hydroxyethyl)-5,6,7,8,9,9-hexachloro - 1,2,3,4,4a,5,8,8a - octahydro - 5,8-methano-2,3-naphthalenedicarboxy imide of the following structure:

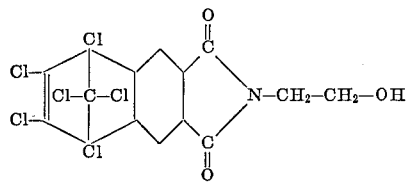

EXAMPLE VII

The imide prepared as described in Example II is used as an additive in polypropylene. This is accomplished by milling approximately 20 g. of the imide with approximately 80 g. of the polypropylene and about 0.5 g. of butylated-hydroxytoluene as an oxidation inhibitor. The mixture is milled for a period of about 10 minutes at a temperature of about 365° F. The treated polypropylene then is cut into strips which contain a glass cloth in the center of the strip to prevent dripping during combustion. The flame retardant properties are evaluated by burning the strip of treated polypropylene in an apparatus similar to the one described by C. P. Fenimore and J. F. Martin in the November 1966 issue of Modern Plastics. The oxygen index is determined and this is defined as the lowest mole fraction of oxygen sufficient to maintain combustion. A control strip of the polypropylene (not containing the imide) has an oxygen index of 0.180 and a rate of combustion of 55 seconds per inch. In contrast, the sample of polypropylene containing the imide has a higher oxygen index and a slower rate of combustion.

EXAMPLE VIII

A liquid epoxy resin having an epoxide equivalent of 190 and commercially known as "Epon 828" is admixed with phthalic anhydride and the imide prepared as described in Example I. The mixture is heated until the mixture becomes homogeneous and then is poured into molds which are prepared from glass sheets using Teflon spacers. In addition, a mold release agent is also used to facilitate removal of the cured resin from the molds. The molds are placed in an air-circulating oven and allowed to cure for a period of about six hours at a temperature of 230° F. By utilizing various widths of spacers, sheets of various thickness are prepared. The sheets are then removed from the mold and cut into strips and are evaluated for flame retardancy. In addition to possessing excellent heat distortion temperatures and hardness, as measured by a Shore durometer, the cured resin will be found to be self-extinguishing when removed from the direct action of a flame.

EXAMPLE IX

Similarly, a mixture of 200 g. of a polymer comprising polyphenyl ether (polyphenylene oxide) which has been modified with styrene and 65 g. of the imide prepared as described in Example VI are admixed at an elevated temperature in order to insure that the mixture is homogeneous. After the mixture is injected into molds and allowed to cool, the resulting composition of matter, upon testing, will be self-extinguishing when removed from the direct action of a flame.

Likewise, polycarbonates, when treated with the imide of the present invention, will also exhibit flame-retardant properties, the treated polymers being self-extinguishing when removed from the action of a flame. In addition, the aforesaid compounds including, but not limited to, the epoxy resins, polycarbonates, polyolefins, polyesters, acrylic plastics, etc., which are treated by the addition of the imides herein described in greater detail, will also exhibit greater stability as regards color when exposed to the direct action of sunlight over a period of time.

EXAMPLE X

The imide prepared as described in Example VI also is used as an additive in acrylonitrile-butadiene-styrene copolymer (ABS). This is effected by milling 150 g. of the copolymer, 50 g. of the imide and 0.3 g. of an additional oxidation inhibitor and then pressing samples in strips as described above with glass cloth in the center of the strip to prevent dripping during combustion. When evaluated in the manner described above, the control sample of ABS has an oxygen index of 0.182. In contrast, the sample containing the imide will have a higher oxygen index and a slower rate of combustion.

I claim as my invention:

1. A solid polymeric composition of improved flame retardant properties containing from about 2% to about 50% by weight of an imide of the structural formula:

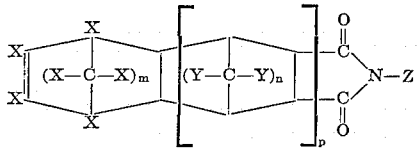

where X is halogen, hydrogen or alkyl of from one to 10 carbon atoms, at least two of the X's being halogen, Y is halogen, hydrogen or alkyl of from one to 10 carbon atoms, $m$ is an integer of from one to four, $n$ ranges from zero to four and $p$ ranges from zero to four, and Z is selected from the group consisting of (a) —R—OH;
(b) —R'—N—(R''—OH)—R'''—OH;
(c) —R'—O—R''—OH;
(d) —R'—O—R''—OH;
(e) —R'—S—R''—OH; and
(f) —R'—(OR'')$_n$—OH, $n$ being 2 to 6;

where R is alkylene containing from 2 to 20 carbon atoms, and R', R'' and R''' are alkylene containing from 2 to 6 carbon atoms each.

2. The composition of claim 1 being plastic or resin.
3. The composition of claim 2 being polyolefin.
4. The composition of claim 3 being polypropylene.
5. The composition of claim 2 being epoxy resin.
6. The composition of claim 2 being polyphenyl ether.
7. The composition of claim 2 being acrylonitrile-butadiene-styrene copolymer.

References Cited

UNITED STATES PATENTS

| | | | |
|---|---|---|---|
| 2,795,589 | 6/1957 | Bluestone | 260—326 |
| 3,280,143 | 10/1966 | Hayes | 260—326 |
| 3,299,094 | 1/1967 | Weil | 260—326 |
| 3,313,763 | 4/1967 | Creighton et al. | 260—41 |
| 3,364,217 | 1/1968 | Cyba | 260—250 |
| 3,455,950 | 7/1969 | Cyba et al. | 260—326 |

DONALD E. CZAJA, Primary Examiner

R. A. WHITE, Assistant Examiner

U.S. Cl. X.R.

106—15 FP, 176; 252—8.1; 260—2.5 AJ